May 25, 1954     H. B. VAN DORN     2,679,399
SLEEVE CHUCK
Filed Nov. 3, 1950
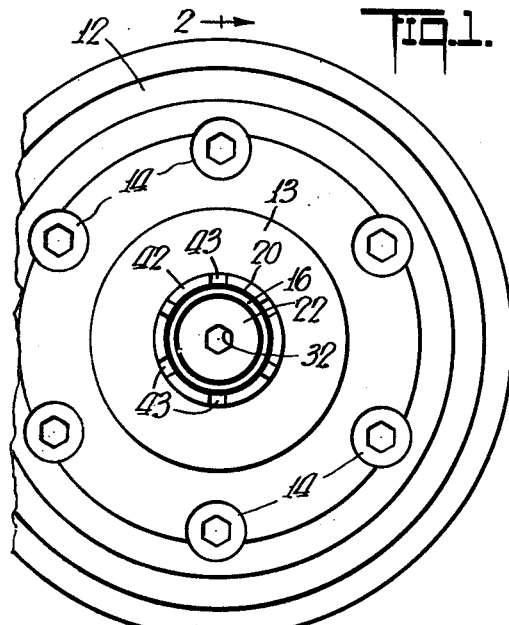
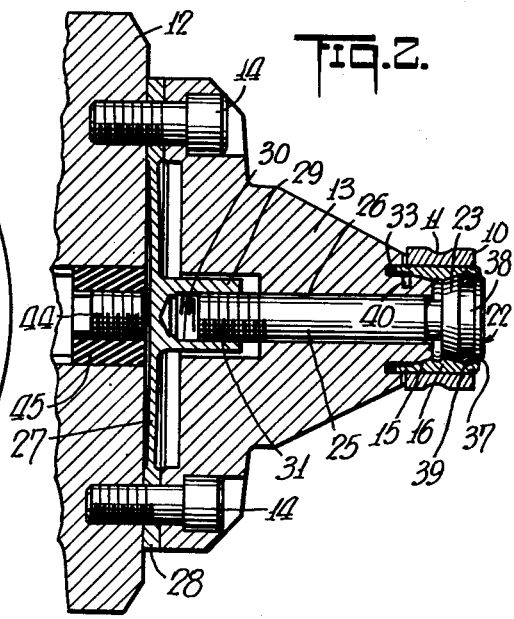
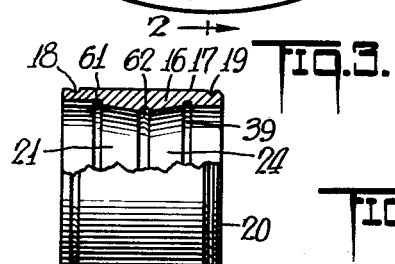
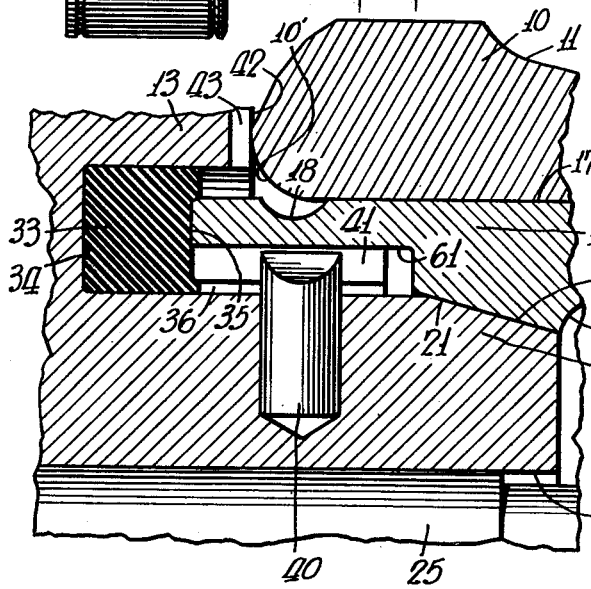
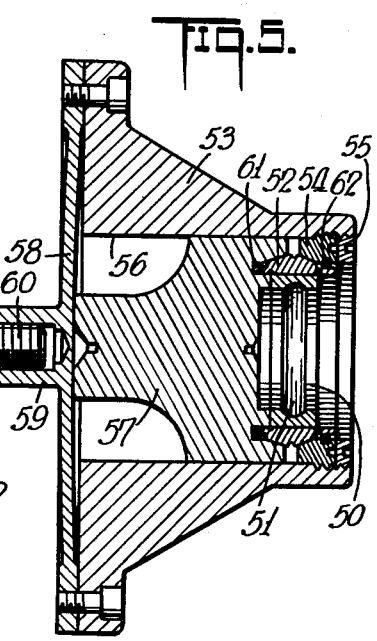
INVENTOR
*Horace B. Van Dorn*
BY
*Mitchell Bechert*
ATTORNEYS Patented May 25, 1954

2,679,399

UNITED STATES PATENT OFFICE 2,679,399

SLEEVE CHUCK

Horace B. Van Dorn, New Britain, Conn., assignor to The Fafnir Bearing Company, New Britain, Conn., a corporation of Connecticut Application November 3, 1950, Serial No. 193,896

13 Claims. (Cl. 279—2)

My invention relates to chucking means, as for chucking bearing rings, piston rings, valve slides, valve-insert seats and the like for precision finishing operations.

When grinding precision parts, such as the inner race or the outer race of an antifriction bearing, the bearing rings must be chucked firmly enough to resist the radial and tangential cutting-wheel forces. Slippage or planetary freedom of the bearing-ring work-piece in the chuck is intolerable. The grip must be adequate to provide a positive hold in spite of thermal expansion of the bearing ring during the grinding process. If chucking means should distort the bearing ring in achieving such a firm grip, a truly ground race will assume a distorted form after release from the chuck, and such distortion in the race may cause noticeable bearing vibration at high rotational speeds.

It has been a practice to chuck inner-race rings in a device employing expanding fingers, and outer-race rings in devices employing inwardly movable pins. These devices necessarily cause stress concentrations, providing a non-uniform stress distribution circumferentially of the bearing ring. In a particular case involving four holding fingers, each of nearly 90° extent, an inner race may be ground truly in the chuck; but, after release from the chuck, the race will be found to include four waves or undulations of say 30 micro-inches magnitude. On thinner-section races, such waves may have an amplitude as great as 75 micro-inches.

It is, accordingly, an object of the invention to provide an improved chucking means of the character indicated.

It is another object to provide a chucking means for supporting antifriction bearing race rings with adequate grip and with substantially no non-uniform deformation of the ring.

It is also an object to provide an improved chucking means which may be prelubricated, fully sealed, and self-contained so as to minimize wear and to avoid the undesirable entrapment of grime and other foreign matter as is characteristic of finger or the like chucks of the past.

It is a further object to provide an improved actuating means for a chuck of the character indicated.

It is in general an object to provide a ring-chucking means which will be positive and foolproof, which will permit the grinding of races or other ring surfaces with substantially improved uniformity, and which may be operated for substantially greater periods of time without need for maintenance.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a front-end view of chucking means according to the invention, shown mounted upon the face plate of a grinding-machine work-head;

Fig. 2 is a vertical sectional view taken substantially in the plane 2—2 of Fig. 1 and showing an inner bearing ring supported for a grinding operation;

Fig. 3 is an enlarged side elevation in partial section of a sleeve member forming part of the chucking means of Figs. 1 and 2;

Fig. 4 is a greatly enlarged fragmentary view in longitudinal section of certain parts shown in Fig. 2; and Fig. 5 is a longitudinal sectional view similar to that of Fig. 2 but showing another embodiment of the invention for the support of an outer race ring for an antifriction bearing.

Briefly stated, my invention contemplates chucking means employing a relatively thin, radially elastically deformable, circumferentially continuous sleeve and means for producing deformation of the sleeve. The sleeve itself must be circumferentially continuous, and the means for producing deformation must also be circumferentially continuous, so as to produce a circumferentially uniform action. Part of the means for producing deformation may be incorporated in the sleeve structure itself; and for the case of supporting rings for external treatment, that is, for the case in which the sleeve is to be expanded into tight-fitting engagement with the bore of an inner-bearing ring, the bore of the sleeve may include a flared surface to match a correspondingly flared actuating surface on a relatively non-deformable actuating member.

In the forms to be described, the sleeve includes two oppositely dished flared surfaces, one of which is tapered to coact with a correspondingly flared actuating surface on a supporting arbor, and the other of which is tapered in accordance with the flare of the actuating surface on a plug. Means may be provided for normally stressing the plug and the arbor relatively to each other in the direction to produce sleeve deformation, the sleeve being relaxed upon a relaxing of the stressing means (i. e. upon further deflection of the stressing means). In the other form to be described, the inner contour or bore of the sleeve may be cylindrical in order to receive the outer surface of an outer bearing ring, and the outer surface of the sleeve may also include two oppositely tapering flared surfaces for coaction with correspondingly flared surfaces on two relatively axially movable actuating members.

Referring to Figs. 1 to 4 of the drawings, my invention is shown in application to chucking means for supporting an inner bearing ring 10 for the purpose of having the raceway 11 thereof finish-ground to relatively high accuracy. The chucking means may be mounted upon the face plate 12 of a grinding-machine work-head. I have shown the chuck to include an arbor 13 secured, as by bolts 14, to the work-head. At the projecting end, the arbor 13 may include a relatively non-deformable inwardly flaring actuating surface 15 for coaction with a sleeve member 16. The sleeve member 16 may be relatively thin and circumferentially continuous; as shown in Fig. 3, it includes a cylindrical outer surface 17 for reception of the bore of the work-sample 10. If desired, the surface 17 may be grooved, as at 18—19, toward the ends thereof so that, upon placement of the ring 10 over the surface 17, dirt, grease, or other foreign matter, may be scuffed off to permit a clean, properly aligned, mounting of the ring 10. To assist in initial location of the ring 10 on the sleeve 16, the outer projecting end may be chamfered as at 20. The bore of the sleeve 16 may be contoured for coaction with the flared surface 15 of the arbor 13, and in the form shown the concave tapered surface 21 is designed to mate with the surface 15. It will be appreciated that, by virtue of the circumferentially continuous nature of the tapered surfaces 15—21 and of the sleeve 16, the radial stresses set up in the sleeve 16 upon a relative axial movement of the arbor 13 and sleeve 16 toward each other will be circumferentially uniform, so that no localized stresses will be set up in the inner bearing ring 10 as the sleeve 16 is expanded into tight-fitting engagement therewith.

The desired axial stressing of the sleeve 16 on the arbor 13 may be achieved by a number of means, but in the form shown I have employed a second relatively non-deformable member in the form of a plug 22 having formed on the outer surface thereof a flare 23 for coaction with a similar flare 24 on the inner contour on the sleeve 16. The coacting flared surfaces 15—21 and 23—24 are preferably oppositely dished as shown, so that a mere relative squeezing of the plug 22 and of the arbor 13 may be sufficient to achieve the chucking functions. To this end, the plug may carry or be formed with a stem 25 extending within and guided by a bore 26 in the arbor 13, with close clearance for accurate alignment.

In accordance with a feature of the invention, I provide means coacting between the arbor 13 and the plug 22 or stem 25 so as always to stress the tapering surfaces in the direction calling for deformation of the sleeve 16. Such means may comprise a coiled spring, but in the form shown I have employed a resilient diaphragm 27 interposed between the arbor 13 and the face plate 12. The rim 28 of the diaphragm 27 may be enlarged or thickened and may be secured in place when the mounting bolts 14 are secured. The diaphragm 27 may be centrally attached to the stem 25 and, in the form shown, I have provided an integral hub 29 on the diaphragm, the hub being bored and tapped, as at 30, to receive the threaded end 31 of the stem 25. By variously tightening the plug 22 into the diaphragm 27, as by application of a wrench to the socket 32, the flared surfaces and, therefore, the sleeve 16 may be variously stressed. In any event, the plug 22 should be tightened to an extent which will deflect the diaphragm for stressing in the same direction, regardless of the chucked or unchucked condition of the mechanism.

To complete the assembly, end clearances between the sleeve 16 and its supporting members 13—22 may be sealed off by employment of resilient gaskets. In the case of the inner end of sleeve 16, the clearance 36 is sealed by a gasket 33 received in a suitable recess 34 in the arbor 13 and so designed with respect to the effective axial depth of the recess 34 and with respect to the adjacent end 35 of the sleeve 16 that the said gasket 33 is always under stress, regardless of the chucked or relaxed relation of other parts of the assembly. By this means, it will be appreciated that the end clearance 36 may always be sealed against entrance of foreign matter, so as to preserve a properly lubricated condition within the chuck. Likewise, at the projecting end of the chuck a resilient gasket member 37 may be received in a circumferential groove 38 in the plug 32 and, if desired, sealing efficacy may be promoted by a circumferentially extending outwardly projecting rib on the gasket 37 and extending for location in a groove 39 in the bore of sleeve 16. As in the case of the gasket 33, I prefer that the gasket 37 shall always be stressed, regardless of the chucked or unchucked condition of my mechanism.

The groove 39 may serve to define a relatively thin-section axial limit for the taper or cam surface 24, so that radial deformations attributable to plug surface 23 acting on sleeve surface 24 may be uniform and substantially radially of these coacting surfaces; in like manner, a similar groove 61 at the end of tapered surface 21 may substantially axially limit the deformation attributable to coaction of surfaces 15—21. Grooves 61—39 may also serve to simplify the grinding of tapers 21—24 by providing end clearances with these surfaces. Finally, a groove 62 between sleeve tapers 21—24 may serve to relieve possible undesired interactions attributable to too-great proximity of the equal and opposite reactions occasioned by concurrent wedging of surfaces 21—24; also, groove 62 may serve as a lubricant reservoir and to promote uniform expansion of all cross-sections of sleeve 16.

In operation, a sleeve 16 is preferably selected with an outside diameter approximately 0.0005 inch under the bore size of the inner ring 10 to be mounted thereon. The ring 10 will ordinarily be applied with a rotational or twisting motion relatively to the sleeve 16. Such motion will be appreciated as promoting the scuffing efficacy of the dirt groove (trap) 19, so that a clean mounting may be made. I prefer that the sleeve shall be positively held against rotation, so as to resist twisting or rotation during the mounting of the ring 10; for this purpose a key or pin 40 or other locating means on the arbor 13 may project into a short longitudinal groove 41 at the inner end of the bore of sleeve 16. If desired, the arbor 13 may be finished with a flat radial shoulder 42 to provide a limiting stop for the inner end face of a bearing ring 10 mounted on the chuck, and the shoulder 42 may be scalloped, as at 43, to provide scuffing and dirt-trap means to assure a clean abutment of the bearing ring 10 against the shoulder 42.

Once the ring 10 has been placed in abutment with the shoulder 42, the chuck may be actuated, that is, radially outwardly deformed upon release of an actuating member 44 from abutment with the diaphragm 27, thus allowing the preloaded resiliency in the diaphragm 27 to produce the deforming action. With the actuating member 44 removed from contact with the diaphragm 27 while the work-sample is chucked, a source of noise and vibration (characteristic of other chuck constructions) will have been avoided, and, if desired, a rubber bushing 45 may assure the noiseless suspension of the actuating member 44 at all times; with a proper placement of bushing 45 on actuator 44, bushing 45 may resiliently assure that actuator 44 will be kept out of direct contact with diaphragm 27 unless the chuck grip is to be released. When the grinding operation has been completed, the actuating member need only be driven against the diaphragm so as to further stress the same and at the same time to relax the chucking means 16 to an extent permitting ready manual withdrawal of the finish-ground ring 10.

In Fig. 5, I show a slightly modified chuck construction for accommodation of rings to be internally finished, such as the outer bearing ring 50 having an outer raceway 51 to be finish-ground. The chucking means of Fig. 5 may again employ a sleeve member 52 characterized by circumferentially continuous construction and having oppositely dished flared surfaces for coaction with relatively non-deformable tapered surfaces on suitable actuating members. One of these members may be directly carried by the arbor 53 and may comprise a ring member 54 secured by a nut 55 at the nose end of an enlarged bore 56 in the arbor. The other actuating member may be a plug 57 supported and accurately guided in the bore 56.

As in the case of the previously described construction, the arbor 53 may be bolted to the face plate of the grinding-machine work-head, and an actuating diaphragm 58 may be clamped in place when the arbor is thus bolted. The diaphragm 58 is shown to include a central boss or hub 59 for threaded reception of an actuating member 60. As before, I prefer that the spring means or diaphragm 58 shall normally stress the chuck in the direction to produce clamping deformation and, since the plug 57 must be pushed toward the sleeve 52 for this purpose, the diaphragm 58 is preferably stressed to the left in the sense of Fig. 5, as suggested by the slightly dished showing of the diaphragm 58. Under the circumstances, chuck opening will take place upon a leftward actuation of the member 60, as will be understood. Gaskets 61—62 may seal the end clearances between the sleeve 62 and the actuating members 54—57, and again I prefer that these gaskets be stressed in the same direction at all times, that is, regardless of the chucked or unchucked condition of the mechanism.

It will be noted that groove 18 may serve to prevent the wearing of a shoulder on sleeve 16 after many pieces have been chucked. All rings or work-pieces 10 will wear sleeve 16 ahead of (i. e. to the right of, in the sense of Fig. 4) the location of groove 18; but all rings do not have the same bore-end or corner radius 10'. Therefore, in the absence of groove 18, there would, in time, develop some inner points of less wear which would create a relatively high spot or shoulder on the chucking surface of sleeve 16. On a work-piece having an unusually small corner radius such a shoulder might seriously non-uniformly distort a chucked work-piece. However, by providing the groove 18 as wide as the anticipated spread of corner-radius intersections with work-piece bores, no shoulder will be developed as the sleeve wears; all work-pieces will wear ahead of (i. e. to the right of) groove 18, and there will be no wear beyond (i. e. to the left of) groove 18.

It will be appreciated that I have described an inherently simple chucking mechanism characterized by circumferential uniformity of chucking action. In practice, I have found such substantial improvement in race-grinding quality for bearing rings supported on my chucking means that it is impossible to attribute any localized stress in the bearing ring to the chucking means itself. In fact, the maximum raceway deviations achieved upon grinding rings supported in my chuck may be of an order of magnitude less than those recited above in the case of conventional finger chucks. My chuck is characterized by long life by virtue of the effective means by which it may be sealed against foreign matter and for prolonged lubrication, and because certain parts lend themselves to highly accurate construction and positioning.

While I have described my invention in detail for the preferred forms shown and as applied to the chucking of bearing-race rings, it will be understood that the invention is also directly applicable to the chucking of piston rings, valve slides, and other ring configurations, and that modifications may be made within the scope of the invention as defined in the appended claims.

I claim:

1. In a chuck, an arbor having an enlarged central bore and including at one end a ring member fitting said bore and axially held therein, said ring member having an inner flared relatively non-deformable actuating surface, a plug supported in said bore and spaced from said ring member and having a bore at the end facing said ring member, and having an inner relatively non-deformable actuating surface in the bore of said plug and flared oppositely to the flare of said ring member, a relatively thin circumferentially continuous sleeve having double opposed flared surfaces on the outer periphery thereof for coaction with said relatively non-deformable flared surfaces upon relative axial movement of said plug and of said arbor, and diaphragm-spring means stressed between said arbor and said stem and in a direction to load said non-deformable surfaces against said sleeve.

2. In a chuck, an arbor having a bore and including at one end an inwardly flared relatively non-deformable actuating surface, a plug having an enlarged head with an outwardly flared relatively non-deformable actuating surface, said plug including a stem extending through the bore in said arbor, a relatively thin circumferentially continuous sleeve having double opposed flared surfaces in the bore thereof for coaction with said relatively non-deformable flared surfaces upon relative axial movement of said stem and of said arbor, and diaphragm spring means stressed between said arbor and said stem and in a direction to load said relatively non-deformable surfaces against said sleeve.

3. In a chuck, an arbor having a bore and including at one end an inwardly flared relatively non-deformable actuating surface, a plug having an enlarged head with an outwardly flared relatively non-deformable actuating surface, said plug including a stem extending through the bore in said arbor, a relatively thin circumferentially continuous sleeve having double opposed flared surfaces in the bore thereof for coaction with said relatively non-deformable flared surfaces upon relative axial movement of said stem and of said arbor, diaphragm-spring means coaxial with said arbor and including a periphery in engagement with said arbor, said spring means being stressed in a direction to load said relatively non-deformable surfaces against said sleeve, and centrally located means securing said diaphragm to said stem for actuating said plug and arbor relatively to each other.

4. A chuck according to claim 3, and including actuating means comprising an axially movable member for abutment with said diaphragm.

5. In a chuck, an arbor having a bore and including at one end an inwardly flared relatively non-deformable actuating surface, a plug having an enlarged head with an outwardly flared relatively non-deformable actuating surface, said plug including a stem extending through the bore in said arbor, a relatively thin circumferentially continuous sleeve having double opposed flared surfaces in the bore thereof for coaction with said relatively non-deformable flared surfaces upon relative axial movement of said stem and of said arbor, diaphragm-spring means stressed between said arbor and said stem and in a direction to load said relatively non-deformable surfaces against said sleeve, and actuating means for said chuck comprising an axially movable member in deflecting relation with said diaphragm, whereby upon an actuated further stressing of said diaphragm by said actuating means the coaction of said flared surfaces may be relaxed.

6. In a chuck, an arbor having a bore, a plug member including a stem extending through said bore, oppositely dished adjacent deforming surfaces on said plug and on said arbor, a sleeve surrounding said dished surfaces and including in the bore thereof corresponding dished surfaces to coact with said first-mentioned dished surfaces upon relative axial movement of said arbor and of said plug, stressing means coacting between said arbor and said plug and stressed in a direction to deform said sleeve, actuating means for said chuck comprising an axially movable member normally disassociated from said arbor and said plug but movable to further deflect said stressing means and thus to relax the coaction of said flared surfaces, and means for resiliently supporting said actuating member when disengaged from said stressing means.

7. In a chuck, an arbor, a sleeve supported on said arbor, coacting flared surfaces on said arbor and on said sleeve, a plug, coacting flared surfaces on said sleeve and on said plug, loading means normally loading said plug and said arbor for relative axial movement in a direction to deform said sleeve, and circumferentially continuous gasket means sealing the clearance between said sleeve and said arbor at one end thereof, said gasket means being of resilient material and normally preloaded, whereby for all normal relative axial movements of said sleeve and of said arbor during chucking and unchucking operations said gasket means may always be in uniform circumferential sealing contact with both said sleeve and said arbor.

8. A chuck according to claim 7, in which said arbor has a uniform circumferentially extending recess to retain said gasket means.

9. In a chuck, an arbor, a sleeve supported on said arbor, coacting flared surfaces on said arbor and on said sleeve, a plug, coacting flared surfaces on said sleeve and on said plug, loading means normally loading said plug and said arbor for relative axial movement in a direction to deform said sleeve, and circumferentially continuous gasket means sealing the clearance between said sleeve and said plug at one end thereof, said gasket means being of resilient material and normally preloaded, whereby for all normal relative axial movement of said sleeve and of said plug during chucking and unchucking operations said gasket means may always be in uniform circumferentially sealing contact with both said sleeve and said plug.

10. A chuck according to claim 9, in which said plug has a uniform circumferentially extending recess to retain said gasket means.

11. As an article of manufacture, a uniformly radially deformable chucking sleeve comprising a straight cylindrical outer surface with a circumferentially extending outwardly facing groove near one end thereof, whereby said groove may serve for the entrapment of foreign matter upon placing said sleeve in the bore of an article to be held, the inner contour of said sleeve comprising two back-to-back outwardly flaring circumferentially continuous frusto-conical surfaces to react with correspondingly flared relatively non-deformable surfaces of an actuating means, said groove being located so near said one end and of such limited axial extent as to be substantially within the axial extent of the corner radius of the end of the bore of the article held therein, so that said groove may in no way limit the ability of said straight cylindrical outer surface to provide longitudinally continuous radial support for the bore of the article held on said sleeve.

12. As an article of manufacture, a uniformly radially deformable chucking sleeve comprising a straight cylindrical outer surface with a circumferentially extending outwardly facing groove near one end thereof, whereby said groove may serve for the entrapment of foreign matter upon placing said sleeve in the bore of an article to be held, the inner contour of said sleeve comprising two back-to-back outwardly flaring circumferentially continuous frusto-conical surfaces to react with correspondingly flared relatively non-deformable surfaces of an actuating means, said inner contour having an inwardly facing groove at the respective outer ends of said flared surfaces, whereby uniform radially outward deformation of said sleeve may be substantially axially confined to substantially the axial limits of said flared surfaces.

13. In a chuck, a uniformly radially deformable chucking sleeve comprising a straight cylindrical surface to receive the cylindrical mounting surface of a work-piece, said straight cylindrical surface having a circumferentially extending radially facing groove near one end thereof, supporting means for said sleeve, cooperating circumferentially continuous surfaces on said sleeve and on said supporting means for deforming said sleeve, said supporting means further including abutment means near said groove for limiting axial placement of a work-piece with respect to said sleeve, said groove being of a width axially of said sleeve to overlap a plurality of possible corner-radius intersections with cylindrical mounting surfaces of work-pieces when said work-pieces are mounted against said abutment means, for the purpose described.

References Cited in the file of this patent

UNITED STATES PATENTS

| Number | Name | Date |
|---|---|---|
| 442,230 | Libby | Dec. 9, 1890 |
| 948,685 | Hall | Feb. 8, 1910 |
| 1,232,704 | Maloy | July 10, 1917 |
| 1,285,763 | Markey | Nov. 26, 1918 |
| 1,448,987 | Spalding | Mar. 20, 1923 |
| 1,827,415 | Bidwell | Oct. 13, 1931 |
| 1,929,285 | Muller | Oct. 3, 1933 |
| 2,026,639 | Klay et al. | Jan. 7, 1936 |
| 2,345,091 | Brace et al. | Mar. 28, 1944 |
| 2,348,819 | Johnson | May 16, 1944 |
| 2,399,831 | Schmidt | May 7, 1946 |
| 2,435,480 | Tuttle | Feb. 3, 1948 |
| 2,468,946 | Sherman | May 9, 1949 |
| 2,469,873 | Ernest | May 10, 1949 |
| 2,513,412 | Holsing | July 4, 1950 |
| 2,573,928 | Peter | Nov. 6, 1951 |
| 2,612,376 | Wollner | Sept. 30, 1952 |

FOREIGN PATENTS

| Number | Country | Date |
|---|---|---|
| 109,231 | Great Britain | 1917 |
| 548,690 | Great Britain | 1942 |
| 610,079 | Great Britain | 1948 |